Figure 1:
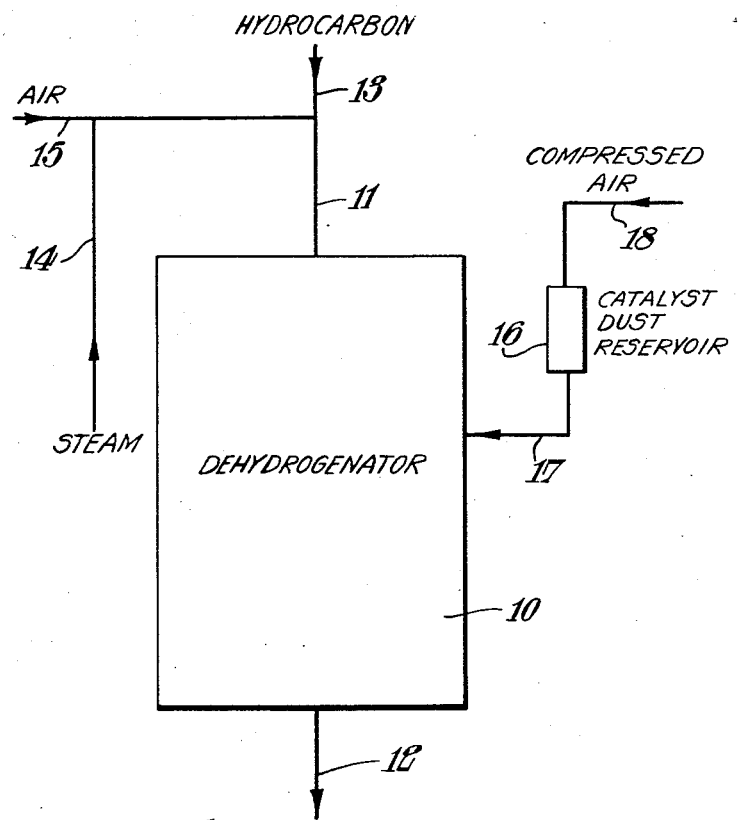

United States Patent Office 2,933,543
Patented Apr. 19, 1960

2,933,543

CALCIUM NICKEL PHOSPHATE CATALYST OF HIGH CRUSHING STRENGTH

Charles Ambridge and Douglas S. Alexander, Sarnia, Ontario, Canada, assignors to Polymer Corporation Limited, Sarnia, Ontario, Canada, a body corporate and politic Application July 30, 1957, Serial No. 675,163

Claims priority, application Canada April 23, 1957

16 Claims. (Cl. 260—680)

This invention relates to the manufacture of catalyst pellets of increased strength. It relates more particularly to those improvements in the manufacture which result in the increasing of the strength of catalyst pellets prepared from a calcium nickel phosphate-chromium oxide composite. The invention also relates to the use of the aforesaid strengthened catalyst in the dehydrogenation of olefinic hydrocarbons.

Before describing the present invention, a few terms, used in the present specification will be defined. In this specification the terms "hardness" and "side crushing strength" are used interchangeably and are defined as the force, in pounds, required to crush a cylindrical pellet of dimensions $3/16$ inch by $3/16$ inch placed on its side between two parallel plates.

"Percent selectivity" may be defined as 100 times the number of moles of olefinic hydrocarbons converted to the desired product, divided by the total number of moles of olefinic hydrocarbon reacted.

"Percent conversion" may be defined as 100 times the number of moles of olefin converted to the desired product, divided by the number of moles of olefin in the feed.

"Yield" (representative of catalytic activity) may be defined as the product of percent conversion times percent selectivity.

Various means have been attempted for improving the efficiency of catalytic processes for dehydrogenating olefinic hydrocarbons. It is well-known that the problem may be approached chiefly from two points of view namely: firstly, attempts have been made to increase efficiency and yield by varying the conditions of the dehydrognation reaction, and secondly, efforts have been made to accomplish the same purpose by use of improved catalysts. The present invention falls in the second category.

Increasing use of butadiene-1,3 in recent years has focused attention on methods for its preparation and in particular on improving the catalytic materials used for this purpose. As butadiene-1,3 is prepared chiefly by the dehydrogenation of n-butylene, most attention has been focused on increasing the efficiency of such reaction. In one method of manufacture, the reaction takes place while passing gaseous n-butylene through a heated, porous, static bed of a dehydrogenation catalyst. To allow maximum throughput of the gas consistent with adequate contact with the catalyst, the latter is usually in the form of small, cylindrical pellets about $3/16$ inch in each dimension.

As can be readily appreciated, the preparation of catalysts in general and dehydrogenation catalysts in particular is not, at the present time, based on sharply defined scientific principles. It is well-known that a particular catalyst of one composition frequently cannot be used in more than one application. Materials which may exert a catalytic action in one case may be inert in another and may encourage undesirable reactions in a third. Catalysts of the same composition but prepared by different methods have also been known to possess widely differing properties. Examples of the latter are shown in column 3, lines 32–37 of U.S. 2,456,367 issued to E. C. Britton and A. J. Dietzler, where it is shown that in the precipitation of calcium nickel phosphate catalyst the pH of the solution has a profound effect on the properties of the catalyst and in column 5, lines 1–32 of U.S. 2,542,813 issued to S. B. Heath where a small difference in the method of mixing results in a great change in the physical properties of the catalyst.

During the process of dehydrogenating the n-butylene gas using pelleted calcium nickel phosphate-chromium oxide catalyst, certain side reactions take place resulting in the undesirable deposition of carbonaceous material on the surface and in the pores of the catalyst pellets, thus reducing their catalytic activity. Frequent reactivation is required. The reactivation or regeneration, as it is more commonly termed, is performed by passing an oxygen-containing gas, e.g. a mixture of air and steam, through the bed of catalyst in order to burn off the deposited carbon. Subjection of the catalyst to this continual and severe cyclic thermal shock as well as to the mechanical shock involved in filling the reactor with the catalyst weakens the pellets and thus exerts a tendency towards breakage and disintegration of the catalyst pellets. This tendency is more pronounced when deeper catalyst beds are used, such deeper catalyst beds involving a resultant increase in pressure drop through the bed. This increased pressure drop, in turn, makes regeneration more difficult and shortens the effective life of the catalyst.

While it is not desired to limit the present invention to any particular theory, it is believed that the failure of the calcium nickel phosphate-chromium oxide catalyst may be attributed to the formation of dust within the bed of catalyst. In order to determine the effect of dust within the catalyst bed upon the formation of carbonaceous deposits within the catalyst bed and its contribution to a shortening of the commercially useful life of the catalyst, a testing means was adopted which involved the injection of powdered catalyst directly into the bed.

Figure 2:
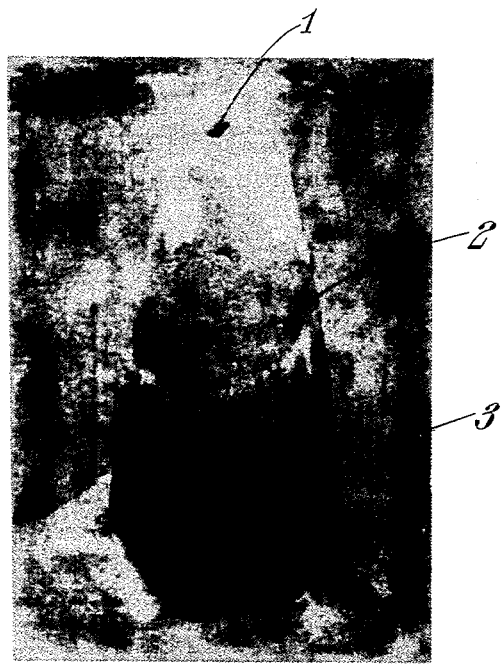

The apparatus used for the injection of the catalyst powder is shown diagrammatically in Fig. 1. It is seen from Fig. 1 that the dehydrogenator 10 is equipped with an inlet means 11 and outlet means 12. When the dehydrogenation reaction take place, the inlet means admit a mixture of hydrocarbon from duct 13 and steam from duct 14. When the regeneration reaction takes place, the inlet means admit a mixture of air, from duct 15, and steam, from duct 14. The catalyst dust reservoir 16 consisted of a piece of pipe three inches in diameter and twenty inches long. One end of the reservoir 16 was attached to the dehydrogenator 10 at a point somewhat below the top of the catalyst bed by means of pipe 17. The other end of the reservoir 16 was attached to a compressed air line 18. During the regeneration of the pelleted catalyst, the powdered catalyst was blown into the reactor by the compressed air through compressed air line 17. About ten pounds of catalyst powder were injected in this manner over a one hour period. On opening up the reactor and discharging the catalyst pellets after only a further thirty hours of use, a carbonaceous mound was found extending from a point immediately below the powdered catalyst injection nozzle to the bottom of the catalyst bed. The mound was about six feet tall; it had a diameter of about 2½ feet at its base and it weighed about 1000 pounds. Fig. 2 is a photograph of this mound and 1 indicates the powdered catalyst injection nozzle, 2 is the mound of carbonaceous material and 3 is the pelleted catalyst. Since the presence of such a mound terminates the useful life of the catalyst, it is reasonable to conclude that the presence of the crushed or powdered catalyst promotes the "failure" of pelleted calcium nickel phosphate-chromium oxide catalyst, in the sense that such presence terminates the useful commercial life of the catalyst.

The purpose of the present invention is to prepare a pelleted calcium nickel phosphate-chromium oxide catalyst of increased strength which retains substantially all of its catalytic activity.

It has now been found that incorporation of diatomaceous earth into the calcium nickel phosphate-chromium oxide catalyst at a certain critical phase of the process for the manufacture of such pellets permits the production of stronger pellets of substantially undiminished catalytic activity. Pellets of up to 100% greater hardness are obtained but, surprisingly, this increase in hardness is only obtained if the diatomaceous earth is incorporated into the system before the precipitated catalyst is first dried. Thus, the objects of the present invention are achieved in the process for the manufacture of shaped pellets of calcium nickel phosphate-chromium oxide catalyst for the dehydrogenation of olefinic hydrocarbons having at least four carbon atoms in the carbon chain containing the olefinic linkage, in the improvement which comprises including a diatomaceous earth for example diatomaceous earth itself or such chemically modified diatomaceous earths as the calcium modified diatomaceous earth known as Micro-cell 9C, such additive being incorporated in an amount up to about 30% by weight of the calcium nickel phosphate by admixing such additive with undried precipitated calcium nickel phosphate. More particularly, the objects of the present invention are achieved in the method of manufacturing shaped pellets of calcium nickel phosphate-chromium oxide catalyst for the dehydrogenation of olefinic hydrocarbons having at least four carbon atoms in the carbon chain containing the olefinic linkage, the phosphate radicals being chemically combined with the calcium and nickel in the relative proportions of from 6.0 to 12.0 atoms of calcium per atom of nickel, and the chromium oxide being present in amount less than 30% of the total weight of the chromium oxide and the calcium nickel phosphate, which comprises precipitating the calcium nickel phosphate under non-acidic conditions from an aqueous solution of a calcium compound, a nickel compound and an ortho-phosphate, separating the precipitated catalyst material from the aqueous phase and washing and drying it, comminuting the dried catalyst and forming an intimate, compactible mixture consisting of the finely comminuted catalyst, a finely comminuted chromium oxide promoter for said dehydrogenation reaction and a removable lubricant, and compacting said intimate mixture into catalyst pellets of the desired shape, the improvement of admixing a diatomaceous earth, selected from the group consisting of diatomaceous earth and chemically modified diatomaceous earth, in amount up to about 30% by weight of the calcium nickel phosphate with said precipitated calcium nickel phosphate catalyst before performing the drying operation.

The present invention also provides an improvement in the process for the dehydrogenation of an olefinic hydrocarbon having at least four carbon atoms in the carbon chain containing the olefinic linkage by passing said olefin through a static catalyst bed in the presence of steam at a temperature between about 550 and about 750° C., by the improvement which comprises conducting said dehydrogenation in the presence of shaped pellets of a calcium nickel phosphate-type catalyst which contains a diatomaceous earth-type additive selected from the group consisting of diatomaceous earth and chemically modified diatomaceous earth, such additive being incorporated in an amount up to about 30% by weight of the calcium nickel phosphate by admixing such additive with undried precipitated calcium nickel phosphate.

In other words, the present invention discloses a process for the dehydrogenation of an olefinic hydrocarbon having at least four carbon atoms in the carbon chain containing the olefinic linkage, said process comprising passing the olefin together with steam at a temperature of between about 550 and about 750° C., through a static bed of pelleted calcium nickel phosphate catalyst, the phosphate containing portion consisting essentially of phosphate radicals chemically combined with calcium and nickel in the relative proportions of from about 6.0 to about 12.0 atoms of calcium per atom of nickel, in admixture with a diatomaceous earth, in the relative proportions of about 99 to about 70 parts by weight of calcium nickel phosphate and respectively about 1 to about 30 parts by weight of said diatomaceous earth-type additive, said pelleted catalyst being prepared by precipitating the calcium nickel phosphate under non-acidic conditions from an aqueous solution of a calcium compound, a nickel compound and an ortho-phosphate, separating the precipitated calcium nickel phosphate from the aqueous phase and washing and drying it, comminuting the dried catalyst and forming an intimate, compactible mixture consisting of the finely comminuted catalyst, the diatomaceous earth additive and a removable lubricant and compacting said intimate mixture into catalyst pellets of the desired shape, said diatomaceous earth-type additive being admixed with said calcium nickel phosphate before performing the drying operation.

The catalyst may be precipitated in the presence of the diatomaceous earth additive (as hereinabove defined) or the diatomaceous earth additive may be added after the precipitation step or it may be added after the freshly precipitated catalyst is separated from the supernatant liquid and washed; but to gain the advantage bestowed by the presence of the diatomaceous earth additive the catalyst must not be dried before such diatomaceous earth additive is added. It is these various alternatives that are intended to be covered by the language admixing with the precipiated calcium nickel phosphate catalyst before drying.

The basic processes for the preparation of calcium-nickel phosphate catalysts and their application to the dehydrogenation of olefinic hydrocarbons, particularly to the dehydrogenation of n-butylene, are described in the above-identified United States patents as well as in U.S. Patent 2,456,368 issued to E. C. Britton and A. J. Dietzler, which processes are to be incorporated into the present specification by reference. It is to be understood further that the present invention is an improvement on the above incorporated processes and products.

Figure 3:
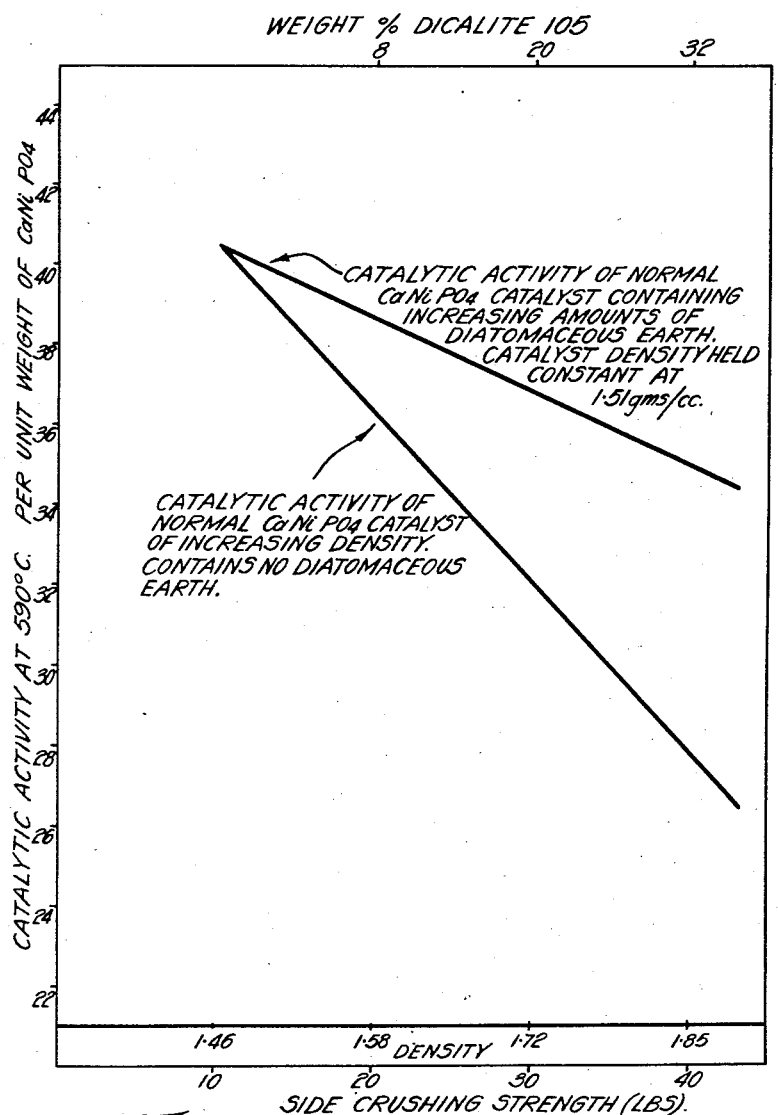

One method of increasing the hardness or side-crushing strength of catalyst pellets which has been attempted is pelleting to a higher density. Experiments carried out by the present inventors have shown that although stronger pellets may be made in this way, the catalytic activity suffers. In Figure 3 there is shown a graph wherein there is plotted (a) catalytic activity vs. side-crushing strength at increasing density or hardness levels of standard calcium nickel phosphate catalyst and (b) catalytic activity vs. side-crushing strength of standard calcium nickel phosphate catalyst containing increasing amounts of the diatomaceous earth-type additive of the present invention to supply increasing hardness at a constant density level. The slopes of the diverging lines indicate that there is considerably less loss in catalytic activity with increasing hardness for the diatomaceous earth-type additive-containing catalyst.

In a suitable method for preparing the strengthened catalyst pellets of the present invention, separate aqueous solutions of phosphoric acid and of ammonia of the desired concentrations were mixed and adjusted to about 25°–30° C. To this mixed solution was added an aqueous solution of a calcium salt and a nickel salt, the calcium and nickel salts being present in the ratio of 6–12 atoms of calcium per atom of nickel. The addition was accomplished slowly, under good agitation, in order to assure complete reaction and precipitation; the pH of the resulting slurry should be between about 7.5 and 12.0 and preferably 7.5–9.0 to obtain best results. The desired amount of the diatomaceous earth type additive was then added and, after thorough mixing, the precipitate was filtered, washed to remove any undesirable water-soluble impurities, and dried. The dried product was crushed, mixed with the chromium oxide promoter and the removable moulding lubricant and formed into pellets. In an alternative process, however, the addition of the diatomaceous earth may be added to one of the solutions prior to the precipitation step.

Another suitable method for preparing the catalyst is similar to that described in the foregoing paragraph but, in this case, the solutions of ammonia and of the calcium and nickel salts were fed as separate converging streams, one of which streams contains a dissolved ortho-phosphate, into a reaction chamber where precipitation is accompilshed. By maintaining the pH of the mixture between 7.7 and 8.3 a rapid settling, more easily filtered, flocculent precipitate of good catalytic activity was obtained.

EXAMPLE 1

*Preparation of catalysts*

Separate aqueous solutions were prepared by dissolving 426 grams of 85% phosphoric acid in 45 liters of water to form the first solution and by dissolving 800 cubic centimeters of 28% ammonia in 5 liters of water to form the second. The ammoniacal solution was then added to that of the phosphoric acid to form ammonium phosphate. The solution was adjusted to room temperature and the pH was determined to be 9.3.152 grams of nickel nitrate hexahydrate and 493 grams of anhydrous calcium chloride were dissolved in 18 liters of water and this solution was added slowly (over a period of about two hours) to the ammonium phosphate solution under good agitation to precipitate calcium nickel phosphate. Stirring was continued for a further half hour at which point the pH of the supernatant liquid was found to be 8.25. The precipitate was washed by decantation until substantially free of chlorides and divided in three equal portions. The first was set aside as a blank. To the second was added 35 grams of Dicalite 105, and to the third was added 35 grams of Celite 270—equivalent to approximately 20% by weight based on the dry calcium nickel phosphate precipitate. Dicalite 105 is a form of diatomaceous earth produced by the Dicalite Division, Great Lakes Carbon Corporation, Chicago, Illinois, while Celite 270 is a form of diatomaceous earth produced by the Canadian Johns-Manville Co., Ltd., Port Credit, Ontario. The contents of each sample were intimately mixed, then filtered and dried in air for 24 hours at 60° C. followed by a further 24 hours' drying in air at 150° C.

After drying, the samples were crushed so that the whole of each sample would pass through a 14 mesh screen. 3.5 grams of powdered chromic oxide promoter and 3.5 grams of powdered graphite lubricant were intimately mixed with each sample and the mixtures were pelleted in a rotary press, model B–2, as manufactured by the F. J. Stokes Machine Co., Philadelphia, Pa. The pellets were cylindrical in shape having dimensions 3/16 inch by 3/16 inch. The mean side crushing strength of each of the samples was measured (based on 50 determinations) after burning off the graphite lubricant. This latter operation was accomplished by charging the pellets into a reactor held at 300°–350° C., starting a flow of steam through the bed of pellets and maintaining the steam flow at 16–20 volumes per volume of catalyst per hour until the temperature of the reactor rose to 575° C. At that point, while still maintaining the flow of steam, air was introduced into the reactor at the rate of 10 volumes of air per volume of catalyst per hour and this flow rate was continued for 15 minutes when it was increased successively to 20 v.(air)/v.(catalyst) for 15 minutes and 50 v.(air)/v.(catalyst) for 30 minutes. The temperature was then raised to 650° C. and the air flow was increased to 400 v.(air)/v.(catalyst) and maintained at that rate until the amount of $CO_2$ in the effluent gases fell below 0.1 volume of $CO_2$ per volume of catalyst per hour.

The results are summarized in Table I.

TABLE I

| Catalyst | Calculated Pellet Density Before Burn-off (gms./cc.) | Measured Mean Side Crushing Strength After Burn-off (lbs.) |
|---|---|---|
| Standard Catalyst (no diatomaceous earth) | 1.70 | 15 |
|  | 1.66 | 13 |
| 20% Dicalite 105 | 1.68 | 32.0 |
| 20% Celite 270 | 1.69 | 30.0 |

The calculated pellet density may be defined as the weight in grams divided by the volume in cubic centimeters. It is obtained by weighing each pellet and measuring each dimension to calculate its volume in cubic centimeters, then dividing the weight by the calculated volume.

These results shows that the presence of 20 weight percent of diatomaceous earth, incorporated according to the process of the present invention, increased the side crushing strength of the catalyst pellets by more than 100%.

EXAMPLE 2

*Effect of varying the concentration of diatomaceous earth*

Catalyst pellets were prepared as described in Example 1 except that the concentration of diatomaceous earth was varied. Side crushing strengths were determined and such results are summarized in Table II.

TABLE II

| Catalyst | Calculated Pellet Density Before Burn-off (gms./cc.) | Measured Mean Side Crushing Strength After Burn-off (lbs.) |
|---|---|---|
| Standard Catalyst (no diatomaceous earth) | 1.60 | 14 |
| 5% Dicalite 105 | 1.60 | 17.5 |
| 10% Dicalite 105 | 1.60 | 23.0 |
| 20% Dicalite 105 | 1.60 | 30.0 |
| 30% Dicalite 105 | 1.60 | 37.0 |
| 40% Dicalite 105 | Pellets capped |  |

Capping of pellets may be defined as an inability to form coherent pellets. In this instance, the pellets were found to separate into two or more separate sections when ejected from the pelleting machine.

These results indicate that the presence of up to about 30% diatomaceous earth per 100 parts basic calcium nickel phosphate catalyst, when incorporated according to the process of the present invention, imparts increased strength to the catalyst pellets.

EXAMPLE 3

*Effect of dry-mixing the diatomaceous earth*

Catalyst pellets were prepared as described in Example 1 except that the diatomaceous earth was added along with the powdered chromium oxide and graphite after the precipitated calcium nickel phosphate catalyst was washed, dried and crushed.

In one test the whole of the crushed calcium nickel phosphate catalyst was used for mixing with the diatomaceous earth in preparing the pellets, while in a second test the crushed catalyst was screened on a 200 mesh screen and only the fines that passed through the screen were used, in order to assure the most intimate mixing possible by dry mixing.

In neither case could coherent pellets be prepared when 20% diatomaceous earth (Dicalite 105) was present. When using 10% of the diatomaceous earth, coherent pellets could be prepared but they were not as strong as the pellets containing no diatomaceous earth. The results are recorded in Table III.

TABLE III

| Catalyst | Mean Side Crushing Strength After Burn-off (lbs.) |
|---|---|
| Standard Catalyst (200 mesh) (no diatomaceous earth) | 16.7. |
| Standard Catalyst (14 mesh) (no diatomaceous earth) | 14.0. |
| Standard Catalyst (200 mesh)+10% Dicalite 105 | 6.1. |
| Standard Catalyst (200 mesh)+20% Dicalite 105 | Pellets capped. |
| Standard Catalyst (14 mesh)+10% Dicalite 105 | 4.7. |
| Standard Catalyst (14 mesh)+20% Dicalite 105 | Pellets capped. |

These results indicate that mixing diatomaceous earth with dried catalyst, i.e. according to a process outside the ambit of the present invention, is not a suitable process for making stronger pellets.

EXAMPLE 4

*Effect of mixing the diatomaceous earth with reslurried dried catalyst*

The calcium nickel phosphate catalyst was precipitated, washed, filtered, dried and crushed as described in Example 1 except that no diatomaceous earth was present during these operations and the catalyst was crushed to 200 mesh size. The crushed catalyst was then made up into an aqueous slurry and the desired amount of diatomaceous earth was mixed into it. This mixture was then filtered, dried and crushed and 2% each of powdered chromium oxide and graphite were mixed into the dried mixture of catalyst and diatomaceous earth. The side crushing strength of pellets prepared from this material was measured and compared with a similarly treated material containing no diatomaceous earth.

Catalyst pellets could not be prepared when 20% diatomaceous earth was present. With 10% diatomaceous earth, coherent pellets could be formed but they were only marginally stronger than the pellets containing no diatomaceous earth.

The results are recorded in Table IV.

TABLE IV

| Catalyst | Mean Side Crushing Strength After Burn-off (lbs.) |
|---|---|
| Standard Catalyst (200 mesh) (no diatomaceous earth) | 9.1 lbs. |
| Standard Catalyst (200 mesh)+10% Dicalite 105 | 11.3 lbs. |
| Standard Catalyst (200 mesh)+20% Dicalite 105 | Pellets capped. |

These results indicate that mixing diatomaceous earth with fine, previously dried then reslurried catalyst, i.e., prepared by a process outside the ambit of the present invention, is not a suitable method for making stronger pellets.

EXAMPLE 5

*Effect of various types of diatomaceous earths*

Catalyst pellets were prepared as described in Example 1 using various types of diatomaceous earth-type additives. All the diatomaceous earth-type additives were effective in increasing the strength of the catalyst pellets. The results are recorded in Table V. In Table VI are recorded typical analyses of the various diatomaceous earth-type additives used.

Micro-cel 9C is a calcium modified diatomaceous earth produced by the Canadian Johns-Manville Co. Ltd., Port Credit, Ontario.

TABLE V

| Catalyst | Calculated Pellet Density Before Burn-off (gms./cc.) | Measured Mean Side Crushing Strength After Burn-off (lbs.) |
|---|---|---|
| Standard Catalyst (no diatomaceous earth) | 1.70 | 19.8 |
| Standard Catalyst, plus: | | |
| 15% Dicalite 105 | 1.71 | 38.0 |
| 15% Dicalite PS | 1.71 | 50.0+ |
| 15% Dicalite SA-1 | 1.72 | 35.6 |
| 15% Celite 270 | 1.71 | 38.5 |
| 15% Celite 319 | 1.70 | 30.6 |
| 15% Micro-cel 9C | 1.72 | 39.9 |

TABLE VI

| Diatomaceous Earth | Dicalite 105 | Dicalite PS | Dicalite SA-1 | Celite 270 | Celite 319 | Micro-cel 9C |
|---|---|---|---|---|---|---|
| Description | Marine | Marine | Natural | Calcined | Flux calcined. | Calcium modified. |
| Moisture, Max., Percent | 6.0 | 0.5 | 6.0 | 1.0 | 1.0 | 7.0. |
| Sp. Gravity | 2.0 | 2.25 | | 2.15 | 2.30 | 2.31. |
| Bulking Value, lbs./gal | 16.7 | 18.75 | | | | |
| Gallons/lb | 0.06 | 0.05 | | | | |
| pH | 6.7 | 7.5 | 7.0 | 7.0 | 7.0 | 10.0. |
| Refractive Index | 1.46 | 1.46 | | 1.41-1.48 | 1.45-1.49 | 1.55. |
| Gardner-Coleman Oil Absorption | 170-200 | 170-200 | 150-170 | 155 | 182 | |
| A.S.T.M. Rubout Oil Absorption | 150-190 | 160-190 | | 100 | 135 | |
| Ave. Percent Retained—325 Mesh Screen | 1.0 | 1.5 | 10.0 | | | |
| Max. Percent Retained—325 Mesh Screen | 2.0 | 2.0 | | 1.5 | | 2.0. |
| Surface Area—Sq. M./gm | | | | | | 175. |
| Surface Area by Nitrogen Absorption, Sq. M./gm. | 29.3 | 3.2 | 20.0 | 4-6 | 1-3.5 | |
| Sedimentation Particle Size Distribution—Percent: | | | | | | |
| +40 Microns | 0 | 5.0 | | | | |
| 20-40 Microns | 1.0 | 1.0 | | | | |
| 10-20 Microns | 3.0 | 6.0 | | | | |
| 6-10 Microns | 9.0 | 10.0 | | | | |
| 2-6 Microns | 42.0 | 58.0 | | | | |
| −2 Microns | 45.0 | 20.0 | | | | |
| Color | Buff | Light Pink | Buff | Light Pink | White | Off White. |
| Typical Spectrographic Analysis (Dry Basis): | | | | | | |
| $SiO_2$ (by difference) | 89.72 | 95.17 | | | | 51.7. |
| $Na_2O$ | 1.23 | 1.03 | | | | 0.5. |
| $Al_2O_3$ | 2.52 | 1.90 | | | | 1.8. |
| $Fe_2O_3$ | 1.40 | 1.05 | | | | 0.9. |
| $CaO$ | 0.38 | 0.08 | | | | 25.3. |
| $MgO$ | 0.47 | 0.40 | | | | |
| $TiO_2$ | 0.10 | 0.07 | | | | |
| $V_2O_5$ | 0.09 | | | | | |
| Ignition Loss | 4.09 | 0.21 | | | | |
| Ignition Loss (1,800° F.) | | | | | | 18.0. |
| Average Particle Size (Microns) | | | | | | 0.02. |

EXAMPLE 6

*Effect of diatomaceous earth on dehydrogenating efficiency of calcium nickel phosphate catalyst at various temperature levels*

Catalyst pellets were prepared as described in Example 1 except that 15% diatomaceous earth (Dicalite 105) per 100 parts of catalyst was incorporated into the pellets.

The catalytic activity of the pelleted catalyst was determined under substantially isothermal conditions throughout the catalyst bed at various temperature levels using a hydrocarbon feed of the following composition:

| | Percent |
|---|---|
| n-Butylene | 82.3 |
| Isobutylene | 6.0 |
| Butadiene | 1.7 |
| Butane | 10.0 |

The conventional catalytic dehydrogenation process was carried out, using the standard cyclic process consisting of a dehydrogenation phase of 30–45 minute duration and a regeneration phase of 30–45 minute duration, and a steam to hydrocarbon ratio of about 18 to 1. The test was of one week duration and the results are recorded in Table VII.

TABLE VII

| | Standard Catalyst (no diatomaceous earth) | Catalyst+15% Dicalite 105 |
|---|---|---|
| Mean side crushing strength before burn-off (lbs.) | 18 | 39 |
| Mean side crushing strength after burn-off (lbs.) | 24 | 44 |
| Bulk density of catalyst (gms./cc.) | 1.08 | 1.09 |
| Calculated pellet density (gms./cc.) | 1.57 | 1.58 |

| Temp. °C.: | Percent Conv. | Percent Selectivity | Overall Yield | Yield based on 100% Active Material | Percent Conv. | Percent Selectivity | Yield | Yield based on 100% Active Material |
|---|---|---|---|---|---|---|---|---|
| 530 | 12.1 | 85.4 | 10.3 | 10.3 | 20.8 | 81.9 | 17.0 | 20.0 |
| 545 | 14.3 | 85.1 | 12.2 | 12.2 | 19.5 | 87.8 | 17.1 | 20.1 |
| 560 | 21.7 | 85.7 | 18.6 | 18.6 | 23.8 | 89.1 | 21.2 | 24.9 |
| 575 | 30.7 | 84.0 | 25.8 | 25.8 | 25.4 | 90.2 | 22.9 | 26.9 |
| 590 | 36.9 | 85.1 | 31.4 | 31.4 | 34.2 | 89.0 | 30.4 | 35.8 |
| 605 | 38.6 | 92.2 | 35.5 | 35.5 | 40.2 | 89.6 | 36.0 | 42.4 |
| 620 | | | | | 45.3 | 88.5 | 40.1 | 47.1 |

These results indicate that no substantial loss in the catalytic activity of the catalysts containing diatomaceous earth is detectable in the course of a one-week test.

EXAMPLE 7

*Effect of varying proportions of diatomaceous earth on catalytic activity of calcium nickel phosphate catalyst at 590° C.*

The dehydrogenation efficiencies of catalyst pellets prepared as described in Example 1 and containing various amounts of diatomaceous earth (Dicalite 105) were determined at 590° C. using the dehydrogenation process described generally in Example 6. A hydrocarbon feed of composition similar to that of Example 6 was used. The results are recorded in Table VIII.

TABLE VIII

| Catalyst | Percent Conv. | Percent Selectivity | Yield at 590° C. (actual) | Yield at 590° C. (corrected) |
|---|---|---|---|---|
| Standard Catalyst (no diatomaceous earth) | 37.7 | 88.5 | 33.4 | 33.4 |
| Standard Catalyst plus: | | | | |
| 10% Dicalite 105 | 29.8 | 92.2 | 27.5 | 30.3 |
| 15% Dicalite 105 | 32.5 | 88.3 | 29.0 | 33.3 |
| 20% Dicalite 105 | 29.0 | 90.8 | 26.3 | 31.5 |
| 30% Dicalite 105 | 24.0 | 91.0 | 22.6 | 30.4 |

The corrected values of column 5 indicate yield at 590° C. based on an amount of basic calcium nickel phosphate catalyst equal to that present in the blank. This corrects for the dilution effect of the diatomaceous earth.

These results indicate no significant difference in catalytic activity per unit weight of active material between catalyst pellets containing diatomaceous earth and catalyst pellets containing no diatomaceous earth.

EXAMPLE 8

*Effect of silica gel*

Silica gel was prepared by diluting 700 grams of water-glass (sodium silicate) with three liters of water, then rapidly adding to it two liters of a dilute hydrochloric acid solution prepared by mixing 400 cubic centimeters of the concentrated acid with three liters of water. The pH of the resulting system was raised to 4.5 by the addition of a small amount of the concentrated water-glass solution. After stirring for one hour, the silica gel was washed by decantation and filtered to obtain the caked gel.

The caked gel, obtained as described above, was redispersed in a small amount of water and added to freshly precipitated calcium nickel phosphate catalyst. After thorough mixing, the mixture was recovered and pelleted as described in Example 1.

The catalyst pellets were tested for hardness and catalytic activity at 590° C. as described in Example 6. The results are summarized in Tables IX and X.

TABLE IX

| Percent Silica Gel (based on Calcium Nickel Phosphate) | 0 | 5 | 10 | 15 | 20 |
|---|---|---|---|---|---|
| Hardness (pellet density=1.58) | 16 | 25 | 31 | 38 | |
| Hardness (pellet density=1.70) | 20 | | 21 | | 43 |

TABLE X

| | Standard Catalyst | Reinforced Catalyst |
|---|---|---|
| Percent Silica Gel | 0 | 20 |
| Pellet Density | 1.54 | 1.54 |
| Yield at 590° C. | 36.9 | 21.6 |
| Yield at 590° C. (corrected to 100% Calcium Nickel Phosphate) | 36.9 | 27.0 |
| Percent Selectivity | 91.0 | 94.0 |
| Percent Conversion | 40.5 | 28.7 |

The low conversion and yield values obtained for the reinforced catalyst as compared to those obtained for the standard catalyst indicate that the presence of silica gel, even when incorporated by the process of the present invention, is undesirable in calcium nickel phosphate dehydrogenation catalyst.

The embodiments of the invention in which an exclusive property or privilege is claimed as defined as follows:

1. In the method of manufacturing shaped pellets of calcium nickel phosphate catalyst for the dehydrogenation of olefinic hydrocarbons having at least four carbon atoms in the carbon chain containing the olefinic linkage, the phosphate radicals being chemically combined with the calcium and nickel in the relative proportions of from 6.0 to 12.0 atoms of calcium per atom of nickel, which comprises precipitating the calcium nickel phosphate under non-acidic conditions from an aqueous solution of a calcium compound, a nickel compound and an ortho-phosphate, separating the precipitated catalyst material from the aqueous phase and washing and drying it to a hard, pulverizable state, comminuting the dried catalyst and forming an intimate, compactible mixture consisting of the finely comminuted catalyst, and a removable lubricant, and compacting said intimate mixture into catalyst pellets of the desired shape, the improvement of admixing a diatomaceous earth, in amount up to about 30% by weight of the calcium nickel phosphate with said precipitated calcium nickel phosphate catalyst before performing the drying operation.

2. The method of claim 10 wherein the diatomaceous earth is added in amount between 10% and 20% of the weight of the calcium nickel phosphate.

3. In the method of manufacturing shaped pellets of calcium nickel phosphate-chromium oxide catalyst for the dehydrogenation of olefinic hydrocarbons having at least four carbon atoms in the carbon chain containing the olefinic linkage, the phosphate radicals being chemically combined with the calcium and nickel in the relative proportions of from 7.5 to 9.2 atoms of calcium per atom of nickel and the chromium oxide being present in amount between 0.5 and 5% of the weight of the calcium nickel phosphate, which comprises precipitating the calcium nickel phosphate with ammonia from an aqueous solution of a calcium compound, a nickel compound and an ortho-phosphate, such that the pH of the resultant mixture after precipitation is between 7.5 and 9.0, separating the precipitated calcium nickel phosphate from the aqueous phase and washing and drying it to a hard, pulverizable state, comminuting the dried catalyst and forming an intimate, compactible mixture consisting of the comminuted catalyst, the finely comminuted chromium oxide promoter for the dehydrogenation reaction and a removable lubricant, and compacting said mixture into catalyst pellets of the desired shape, the improvement of admixing diatomaceous earth in amount up to about 30% of the weight of the calcium nickel phosphate with said precipitated calcium nickel phosphate catalyst after performing the precipitation step but before performing the drying operation.

4. The method of claim 3 wherein the diatomaceous earth is added in amount between 10% and 20% of the weight of the calcium nickel phosphate.

5. The dehydrogenation catalyst of claim 2.
6. The dehydrogenation catalyst of claim 3.
7. The dehydrogenation catalyst of claim 4.
8. A process for the dehydrogenation of an olefinic hydrocarbon having at least four carbon atoms in the carbon chain containing the olefinic linkage, said process comprising passing the olefin, together with steam at a temperature of between about 550 and about 750° C., through a static bed of pelleted calcium nickel phosphate catalyst, the catalyst pellets being comprised of a phosphate containing portion consisting essentially of phosphate radicals chemically combined with calcium and nickel in the relative proportions of from about 6.0 to about 12.0 atoms of calcium per atom of nickel, in admixture with a diatomaceous earth in the relative proportions of about 99 to about 70 parts by weight of calcium nickel phosphate and respectively about 1 to about 30 parts by weight of said diatomaceous earth, said pelleted catalyst being prepared by precipitating the calcium nickel phosphate under non-acidic conditions from an aqueous solution of a calcium compound, a nickel compound and an ortho-phosphate, separating the precipitated calcium nickel phosphate from the aqueous phase and washing and drying it to a hard, pulverizable state, comminuting the dried catalyst and forming an intimate, compactible mixture consisting of the finely comminuted catalyst, the diatomaceous earth and a removable lubricant and compacting said intimate mixture into catalyst pellets of the desired shape, said diatomaceous earth being admixed with said calcium nickel phosphate before performing the drying operation.

9. The process of claim 8 wherein finely comminuted chromium oxide promoter for the dehydrogenation reaction in amount of 1–30% by weight of the total weight of the chromium oxide and calcium nickel phosphate is admixed with the finely comminuted catalyst, diatomaceous earth and removable lubricant prior to the compacting step.

10. The method of claim 1 wherein finely comminuted chromium oxide promoter for the dehydrogenation reaction is admixed, in amount up to 30% by weight of the total weight of the chromium oxide and calcium nickel phosphate, with the finely comminuted catalyst and removable lubricant prior to the compacting step.

11. The method of claim 1 wherein the diatomaceous earth is admixed with the calcium nickel phosphate catalyst after the catalyst has been precipitated but before the catalyst has been dried to a hard, pulverizable state.

12. The method of claim 10 wherein the diatomaceous earth is admixed with the calcium nickel phosphate catalyst after the catalyst has been precipitated but before the catalyst has been dried to a hard, pulverizable state.

13. The dehydrogenation catalyst of claim 1.
14. The dehydrogenation catalyst of claim 10.
15. The dehydrogenation catalyst of claim 11.
16. The dehydrogenation catalyst of claim 12.

References Cited in the file of this patent

UNITED STATES PATENTS

| | | |
|---|---|---|
| 2,456,367 | Britton et al. | Dec. 14, 1948 |
| 2,456,368 | Britton et al. | Dec. 14, 1948 |
| 2,542,813 | Heath | Feb. 20, 1951 |
| 2,824,843 | Dietzler et al. | Feb. 25, 1958 |